(12) United States Patent
Arcese et al.

(10) Patent No.: US 9,003,392 B2
(45) Date of Patent: Apr. 7, 2015

(54) USE OF CLONING IN MAINTENANCE OF VIRTUAL APPLIANCES

(71) Applicant: International Business Machines Corporation, Armonk, NY (US)

(72) Inventors: Mauro Arcese, Rome (IT); Giuseppe Ciano, Rome (IT); Antonio Di Cocco, Rome (IT); Luigi Pichetti, Rome (IT); Marcin Mirecki, Cracow (PL)

(73) Assignee: International Business Machines Coporation, Armonk, NY (US)

( * ) Notice: Subject to any disclaimer, the term of this patent is extended or adjusted under 35 U.S.C. 154(b) by 141 days.

(21) Appl. No.: 13/633,948

(22) Filed: Oct. 3, 2012

(65) Prior Publication Data

US 2013/0091498 A1  Apr. 11, 2013

(30) Foreign Application Priority Data

Oct. 5, 2011  (EP) ................................. 11183905

(51) Int. Cl.
*G06F 9/44* (2006.01)
*G06F 9/455* (2006.01)
*G06F 9/445* (2006.01)

(52) U.S. Cl.
CPC *G06F 9/455* (2013.01); *G06F 8/63* (2013.01); *G06F 2009/45562* (2013.01); *G06F 8/67* (2013.01)

(58) Field of Classification Search
CPC ... G06F 9/45504; G06F 9/45537; G06F 9/50; G06F 9/5083; H04L 63/0807; H04L 63/0815; H04L 9/3213; H04L 63/166
USPC ......................................................... 717/178
See application file for complete search history.

(56) References Cited

U.S. PATENT DOCUMENTS

| | | | |
|---|---|---|---|
| 2008/0059960 A1* | 3/2008 | Akiyoshi | 717/170 |
| 2008/0104588 A1* | 5/2008 | Barber et al. | 718/1 |
| 2008/0215796 A1 | 9/2008 | Lam et al. | |
| 2009/0183182 A1 | 7/2009 | Parthasarathy et al. | |
| 2009/0210869 A1 | 8/2009 | Gebhart et al. | |
| 2009/0217244 A1 | 8/2009 | Bozak et al. | |
| 2009/0222812 A1* | 9/2009 | Nissen et al. | 717/173 |
| 2009/0249324 A1 | 10/2009 | Brar et al. | |

(Continued)

OTHER PUBLICATIONS

IBM, Rapid, Reliable, and Automated Method for Virtual Machine Cloning, Dec. 6, 2005, pp. 1-3.*

(Continued)

*Primary Examiner* — Don Wong
*Assistant Examiner* — Reshaun M Finkley
(74) *Attorney, Agent, or Firm* — Thomas E. Lees, LLC

(57) ABSTRACT

Maintenance of a virtual appliance is provided. The virtual appliance comprises a set of software components each one installed on a corresponding virtual machine. A maintenance descriptor is provided comprising an indication of a new level of at least each one of the software components to be updated thereto. For each software component indicated in the maintenance descriptor, a current level is determined of the software component that is installed on the corresponding virtual machine. A set of old ones of the software components to be actually updated is determined according to a comparison between the corresponding current levels and new levels. The virtual appliance is then cloned. The cloned virtual appliance is updated by updating each old software component thereof to the new level. The virtual appliance is now replaced by the updated cloned virtual appliance.

22 Claims, 8 Drawing Sheets

(56) References Cited

U.S. PATENT DOCUMENTS

| | | | |
|---|---|---|---|
| 2009/0300151 | A1 | 12/2009 | Friedman et al. |
| 2009/0300596 | A1* | 12/2009 | Tyhurst et al. ............... 717/173 |
| 2009/0300604 | A1 | 12/2009 | Barringer |
| 2009/0300641 | A1* | 12/2009 | Friedman et al. ............ 718/104 |
| 2010/0011353 | A1 | 1/2010 | Chalupa et al. |
| 2010/0312865 | A1 | 12/2010 | Criddle et al. |
| 2012/0054736 | A1* | 3/2012 | Arcese et al. ................ 717/172 |

OTHER PUBLICATIONS

Disclosed Anonymously, A Method of Keeping System Virtual Machines Up-to-date, Jun. 15, 2011, pp. 1-3.*

Amir Vahid Dastjerdi, Sayed Gholam Hassan Tabatabaei, & Rajkumar Buyya; Cloud Computing & Distrib. Sys. (CLOUDS) Laboratory, Dept. Computer Science & Software Eng'g, The Univ. of Melbourne, VIC 3010, Australia, Dept. of Software Eng'g, Faculty of Computer Science & Info. Sys., & Universiti Teknologi Malaysia (UTM), 81310 Skudai, Johor, Malaysia; "An Effective Architecture for Automated Appliance Management System Applying Ontology-Based Cloud Discovery", 2010 10th IEEE/ACM Int'l. Conference on Cluster, Cloud & Grid Computing.

rPath; "Best Practices for Building Virtual Appliances", White Paper; 2008, www.rpath.com.

Diego Kreutz and Andrea Charao; Universidade Federal do Pampa, Alegrete, Brazil and Universidade Federal de Santa Maria, Santa Maria, Brazil; ; "Flex VAPs: A System for Managing Virtual Appliances in Heterogeneous Virtualized Environments", 2009; 2009 IEEE.

Sun Microsystems, Inc.; "Model-Driven Application Deployment for Cloud Computing Environments", White Paper; Jan. 2010.

Cognizant; "Virtual Appliances—Building, Supporting Applications Faster, Better & Cheaper", Cognizant Solutions Overview; 2008, http://www.cognizant.com/InsightsWhitepapers/virtual_appliance_solutions.pdf.

Constantine Sapuntzakis, David Brumley, Ramesh Chandra, Nickolai Zeldovich, Jim Chow, Monica S. Lam and Mendel Rosenblum; Computer Systems Laboratory, Stanford University; "Virtual Appliances for Deploying and Maintaining Software", 2003, http://people.csail.mit.edu/nickolai/papers/lisa03-deploying-vap.pdf.

The Open Virtualization Format (OVF) on Wikipedia; 2007, http://en.wikipedia.org/wiki/Open_Virtualization_Format.

DMTF; "Open Virtualization Format Specification", Document Number DSP0243, Version 1.1.0; DMTF Standard; Jan. 12, 2010; http://dmtf.org/standards/published_documents/DSP0243_1.1.0.pdf.

Sean Kelly; "The World As I See It—Take a Hot Clone of a Virtual Machine in ESX Server", livejournal.com; Apr. 28, 2007, http://smkelly.livejournal.com/66017.html.

Rich Brambley; "Cloning a Running Virtual Machine using the Service Console"; VM /ETC; May 26, 2008; http://vmetc.com/2008/05/26/cloning-a-running-virtual-machine-using-the-service-console/.

IBM Corporation; "Tivoli Configuration Manager 4.3.1: the Change Manager Component"; downloaded Jun. 14, 2012; http://publib.boulder.ibm.com/infocenter/tivihelp/v3r1/topic/com.ibm.tivoli.itcm.doc/cmdsmst141.htm#ds42ccm997091.

Virtualization.info Staff; "The Hidden Risk of Virtual Appliances", virtualization.info; Jan. 8, 2007; http://virtualization.info/en/news/2007/01/hidden-risk-of-virtual-appliances.html.

VMware, Inc. And XenSource, Inc.; "The Open Virtual Machine Format Whitepaper for OVF Specification", version 0.9, 2007; http://www.vmware.com/pdf/ovf_whitepaper_specification.pdf.

Virtual Appliances on Wikipedia, downloaded Jun. 14, 2012; http://en.wikipedia.org/wiki/Virtual_appliance.

Wikibooks; "QEMU/Images", downloaded Jun. 14, 2012; http://en.wikibooks.org/wiki/QEMU/Images.

Conary (package manager) on Wikipedia, downloaded Jun. 14, 2012; http://en.wikipedia.org/wiki/Conary_(package_manager).

Marcello Vitaletti, Christine Draper, Randy George, Julia McCarthy, Devin Poolman, Tim Miller, Art Middlekauff and Carlos Montero-Luque; "Installable Unit Deployment Descriptor Specification Version 1.0", W3C Member Submission Jul. 12, 2004; Section 2 and Section 3; International Business Machines Corporation, InstallShield Software Corporation, Novell, Inc. And Zero G Software, Inc.; http://www.w3.org/Submission/2004/SUBM-InstallableUnit-DD-20040712/.

Heng Chu, Christine Draper, Marcello Vitaletti, Randy George, Julia McCarthy, Devin Poolman, Tim Miller, Art Middlekauff and Carlos Montero-Luque; "Installable Unit Package Format Specification Version 1.0", W3C Member Submission Jul. 12, 2004; Section 2 and Section 3; International Business Machines Corporation, InstallShield Software Corporation, Novell, Inc. and Zero G Software, Inc.; http://www.w3.org/Submission/2004/SUBM-InstallableUnit-PF-20040712/.

* cited by examiner

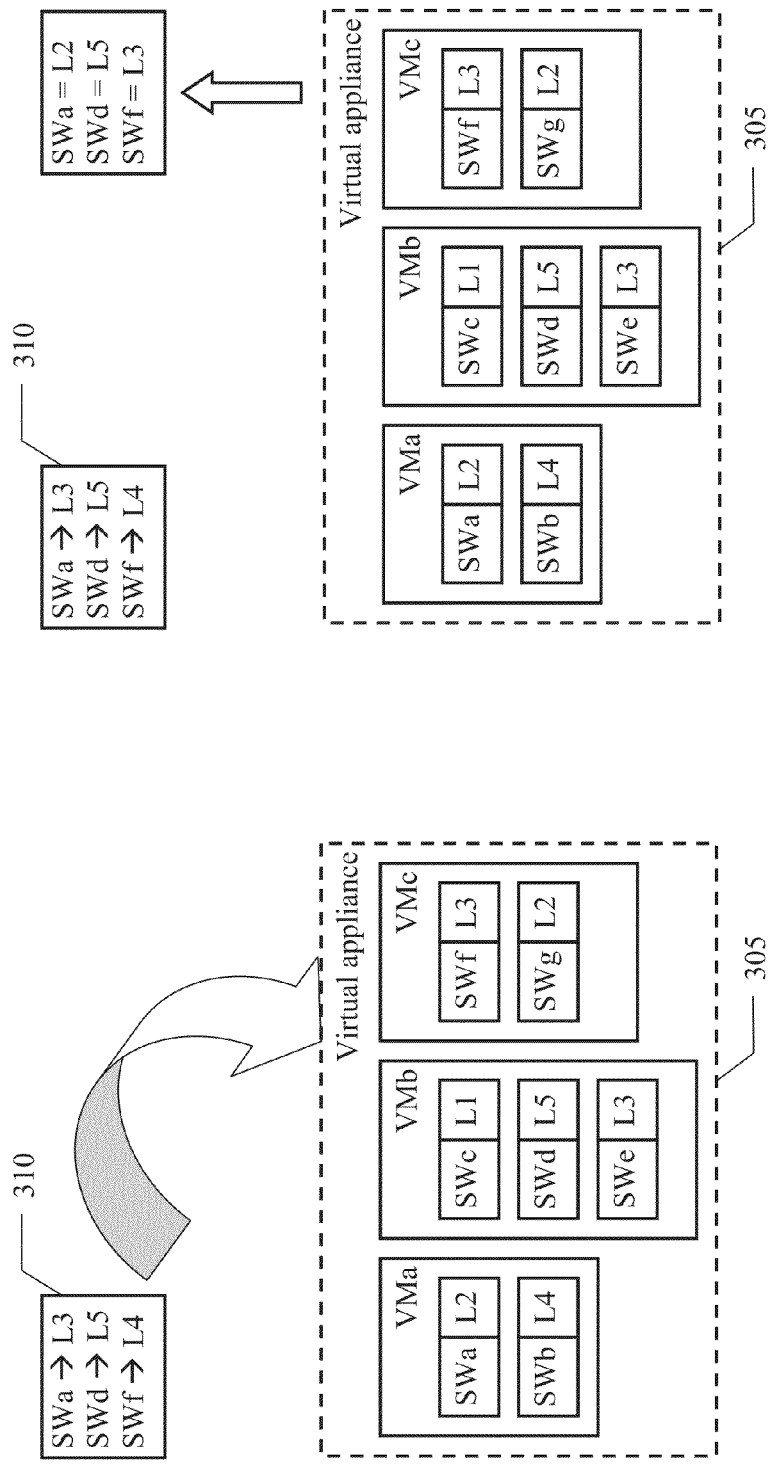

USE OF CLONING IN MAINTENANCE OF VIRTUAL APPLIANCES

CROSS-REFERENCE TO RELATED APPLICATIONS

This application claims priority to European Patent Application No. EP 11183905.6, filed Oct. 5, 2011, the disclosure of which is incorporated herein by reference.

BACKGROUND

The present invention relates generally to data-processing and more particularly to virtual appliances.

Virtual appliances are a specific type of software appliances. In general, a software appliance is a software solution comprising a software application (i.e., one or more application programs performing a specific user task) and a Just Enough Operating System (JeOS) (i.e., a limited operating system specifically tailored to support the software application), which are encapsulated in a pre-built, self-contained unit. The software appliance provides for simplified management and improved isolation with respect to a standard software application running on a full general-purpose operating system.

In particular, a virtual appliance is a software appliance designed to run in a virtualized environment; for this purpose, the virtual appliance comprises one or more virtual machines (i.e., emulations by software of physical machines), each one with its operating system and application programs. Virtual appliances allow provisioning corresponding services in a very simple and fast way.

Each virtual appliance (like any other software artifact) is subject to continual maintenance operations during its life cycle. Particularly, patches (of fixes) are often applied to correct errors or to address security issues temporarily. Periodically, new versions or releases of the virtual appliance (incorporating all the available patches and providing new functions) are delivered.

However, the maintenance of the virtual appliance is quite complex; indeed, maintenance of a virtual appliance generally requires a number of updates to its entire stack of software components (i.e., operating systems, application programs and/or virtual machines), especially in large virtual appliances that comprise multiple application tiers, each one of them in turn comprising multiple virtual machines with corresponding operating systems and application programs.

SUMMARY

According to aspects of the present invention, maintenance of a virtual appliance is provided. The virtual appliance comprises a set of software components each one installed on a corresponding virtual machine. A maintenance descriptor is provided comprising an indication of a new level of at least each one of the software components to be updated thereto. For each software component indicated in the maintenance descriptor, a current level is determined of the software component that is installed on the corresponding virtual machine. A set of old ones of the software components to be actually updated is determined according to a comparison between the corresponding current levels and new levels. The virtual appliance is then cloned. The cloned virtual appliance is updated by updating each old software component thereof to the new level. The virtual appliance is now replaced by the updated cloned virtual appliance.

BRIEF DESCRIPTION OF THE SEVERAL VIEWS OF THE DRAWINGS

Various aspects of the present invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly:

FIGS. 3A-F show an exemplary scenario of various aspects of the present invention.

DETAILED DESCRIPTION

In its general terms, several aspects of the present invention drive the maintenance of virtual appliances according to an actual state of those virtual appliances.

Further aspects of the present invention handle the update of a virtual appliance by automating and consolidating both the packaging and the delivery of the update. Particularly, aspects herein are automatically able to detect which specific update is required, according to the current state of the appliance, and to automatically apply any necessary update. As such, aspects of the present invention manage the maintenance of virtual appliances by facilitating an incremental update, based on the detected state of the appliance. Thus, the update applies to only that which actually requires an upgrade. Additional capabilities provided and described more fully herein include the ability to roll-back, e.g., in case of failure, and provide for the minimization of the system downtime required to apply the update, e.g., through hot cloning of the original appliance.

Figure 1:
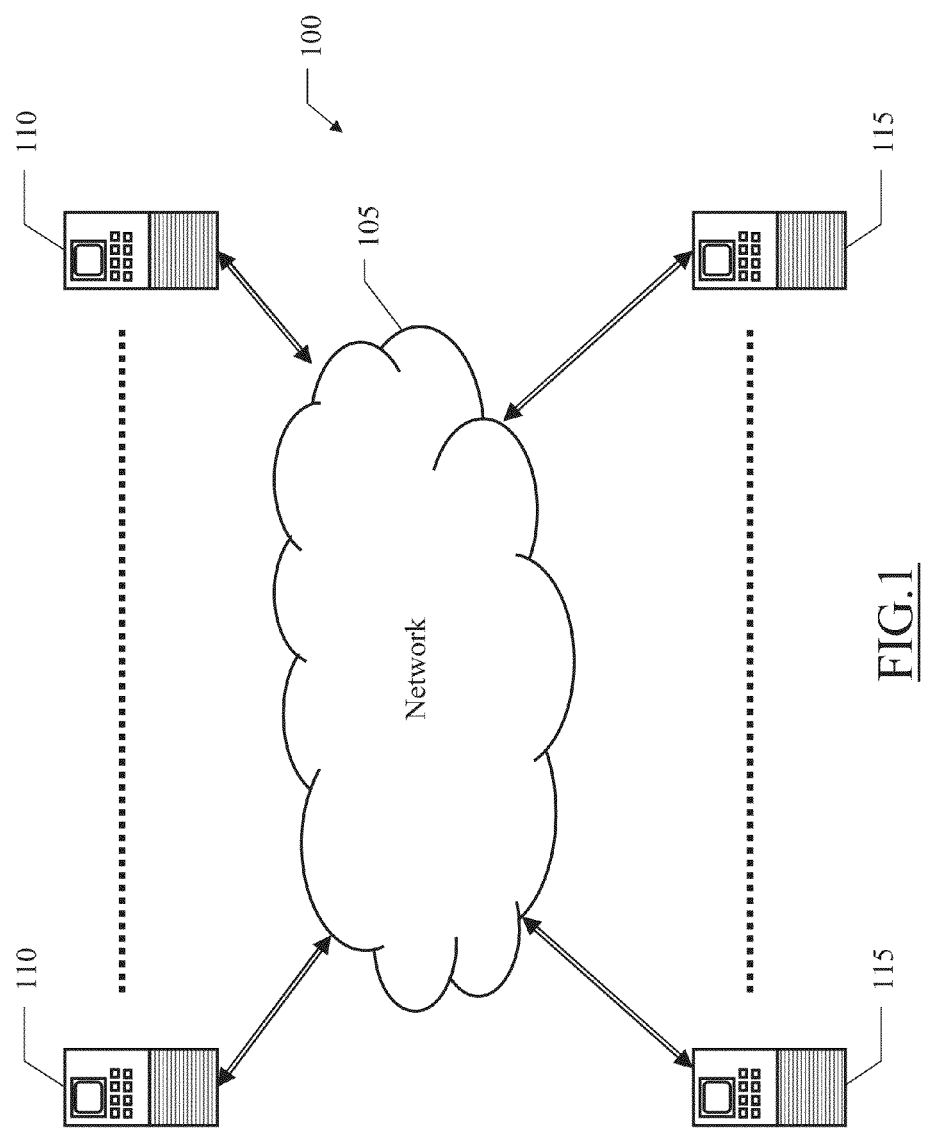
FIG. 1 shows a pictorial representation of a data-processing infrastructure according to various aspects of the present invention.

With reference now to FIG. 1, a pictorial representation is shown of an exemplary data-processing infrastructure 100 according to various aspects of the present invention. The exemplary data-processing infrastructure 100 has a distributed architecture, which is based on a network 105 (for example, the Internet). Multiple physical and/or virtual machines are connected one to another through the network 105. Particularly, one or more provider machines 110 manage the deployment of virtual appliances and their maintenance. For instance, according to aspects of the present invention, a virtual appliance provider may comprise a software vendor that releases both a virtual appliance and corresponding upgrades. In some instances, it may be possible to directly download binaries and metadata associated to the appliance from the provider site.

Each virtual appliance is installed on one or more user machines 115. For this purpose, each user machine 115 comprises a virtualization layer (or hypervisor), which emulates one or more virtual machines (each one including an abstract environment giving the appearance of a physical machine, which the virtual machine has sole control of); an example of commercial virtualization layer is VMWare® ESX. ("VMWare" is a registered trademark of VMWare, Inc., a Delaware Corporation, located at 3401 Hillview Ave., Palo Alto, Calif. 94304.) Each virtual appliance comprises one or more virtual machines (running on one or more user machines 115); in turn, each virtual machine comprises an operating system defining its software platform (for example, a JeOS), and one or more application programs running on top of the operating system.

Figure 2:
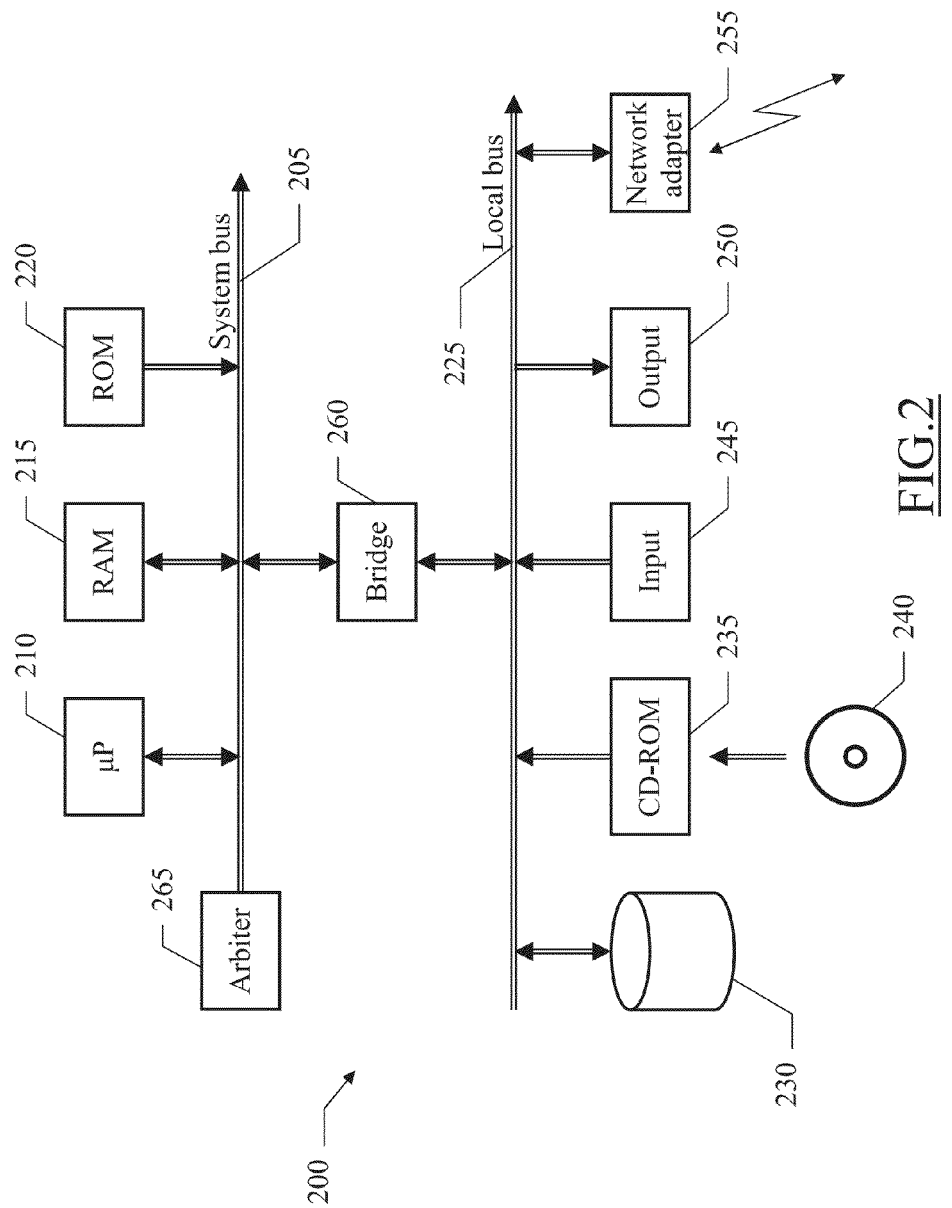
FIG. 2 shows a schematic block diagram of a generic computer of the data-processing infrastructure of FIG. 1.

Moving to FIG. 2, a schematic block diagram of a generic computer 200 of the exemplary data-processing infrastructure is shown. The computer 200 (used to implement the above-mentioned physical or virtual machines) is formed by several units that are connected in parallel to a system bus 205 (with a structure that is suitably scaled according to the actual function of the computer 200 in the data-processing infrastructure). In detail, one or more microprocessors (g) 210 control operation of the computer 200; a RAM 215 is used as a working memory by the microprocessors 210, and a ROM 220 stores basic code for a bootstrap of the computer 200. Several peripheral units are clustered around a local bus 225 (by means of respective interfaces). Particularly, a mass memory comprises one or more hard disks 230 and drives 235 for reading DVD- or CD-ROMs 240. Moreover, the computer 200 comprises input units 245 (for example, a keyboard and a mouse), and output units 250 (for example, a monitor and a printer). A network adapter 255 is used to connect the computer to the network (not shown in the figure). A bridge unit 260 interfaces the system bus 205 with the local bus 225. Each microprocessor 210 and the bridge unit 260 may operate as master agents requesting an access to the system bus 205 for transmitting information. An arbiter 265 manages the granting of the access with mutual exclusion to the system bus 205. The computer 200 or components thereof can implement the methods and computer-readable storage devices as set out in greater detail herein.

An exemplary scenario of various aspects to the present invention is shown in FIGS. 3A-F.

Starting from FIG. 3A, a generic virtual appliance 305 (installed on one or more user machines, not shown in the figure) comprises three virtual machines VMa, VMb and VMc. The virtual machine VMa comprises two software components SWa and SWb (each one consisting of either an operating system or an application program); the software component SWa is at level L2 and the software component SWb is at level L4 (for example, defined by their version and/or release). The virtual machine VMb instead comprises a software component SWc at level L1, a software component SWd at level L5 and a software component SWe at level L3. Thus, the virtual machine VMc comprises a software component SWf at level L3 and a software component SWg at level L2.

According to several aspects of the present invention, the maintenance of the virtual appliance 305 is driven by a maintenance descriptor 310 (for example, retrieved from the provider machine of the virtual appliance that publishes it when an update of the virtual appliance is delivered). The maintenance descriptor 310 comprises a list of software components that should be updated to new levels (generally consisting of upgrades thereof fixing problems, solving security issues and/or adding further functions). Thus, as an example, a maintenance descriptor may comprise a document that contains metadata information used by the system for handling the maintenance of the appliance. In the example at issue, the maintenance descriptor 310 indicates that the software component SWa should be updated to level L3, the software component SWd should be updated to level L5 and the software component SWf should be updated to level L4.

Moving to FIG. 3B, for each software component indicated in the maintenance descriptor 310, its current level in the virtual appliance 305—i.e., on the virtual machine wherein it is installed—is determined (for example, by running a corresponding discovering command indicated in the maintenance descriptor 310 on its virtual machine). In this case, the operation determines that the software component SWa is at the level L2, the software component SWd is at the level L5 and the software component SWf is at the level L3.

Figure 3C:
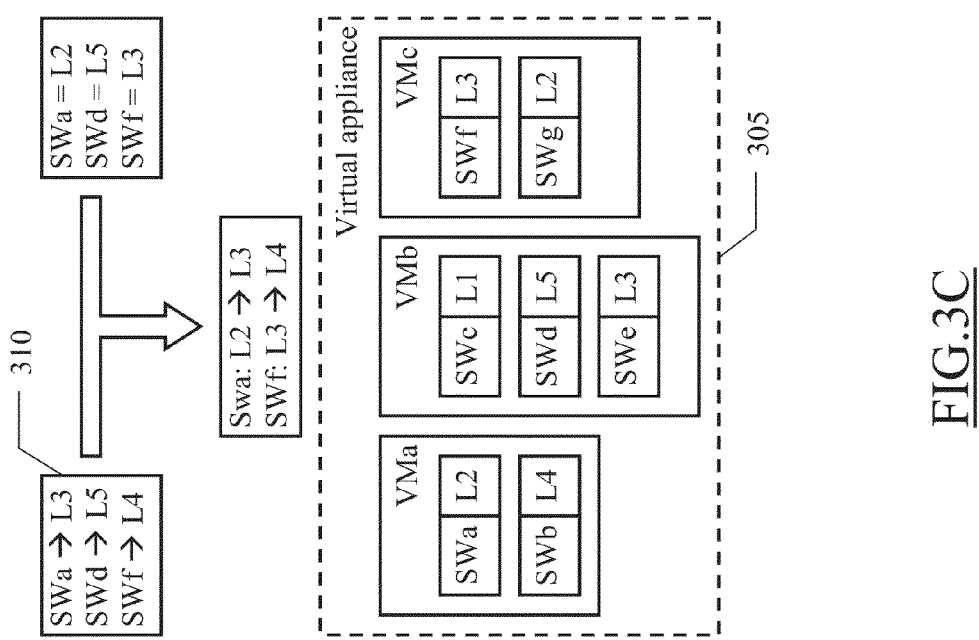

With reference now to FIG. 3C, the (old) software components that should be updated in the virtual appliance 305 are determined according to a comparison between the corresponding current levels (as discovered above) and new levels (as indicated in the maintenance descriptor 310) (for example, when the current level is different than the new level). In the example at issue, the software component SWa should be updated from the level L2 to the level L3 and the software component SWf should be updated from the level L3 to the level L4; conversely, no action is required for the software component SWd, since it is already at the desired level L5.

Figure 3D:
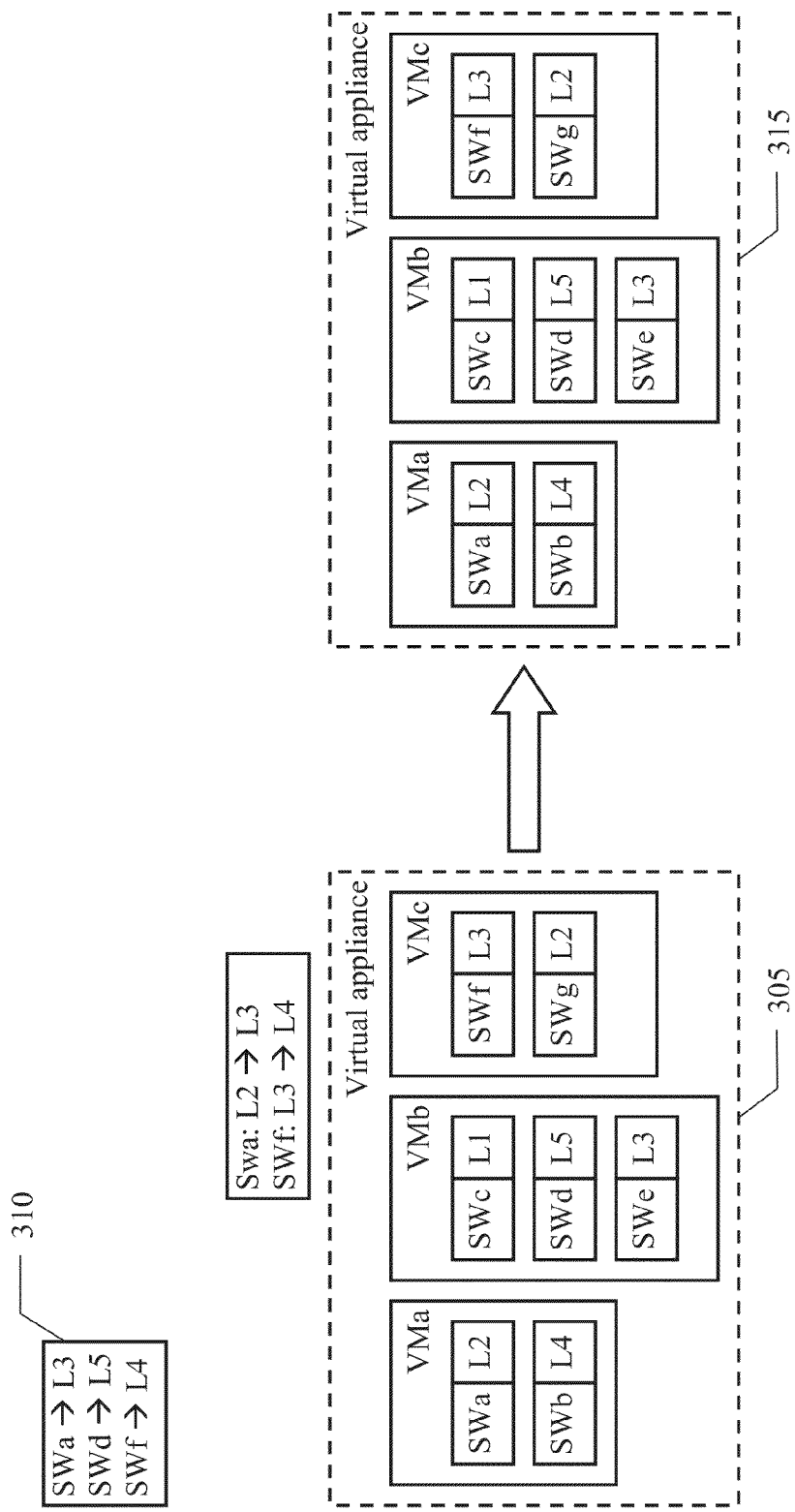

As shown in the FIG. 3D, the virtual appliance 305 is cloned into a virtual appliance 315 (for example, by requesting the hypervisor of the user machine hosting the corresponding virtual machines to hot-clone them). For clarity, the current virtual appliance is denoted as 305 and the cloned virtual appliance is denoted as 315.

Figure 3E:
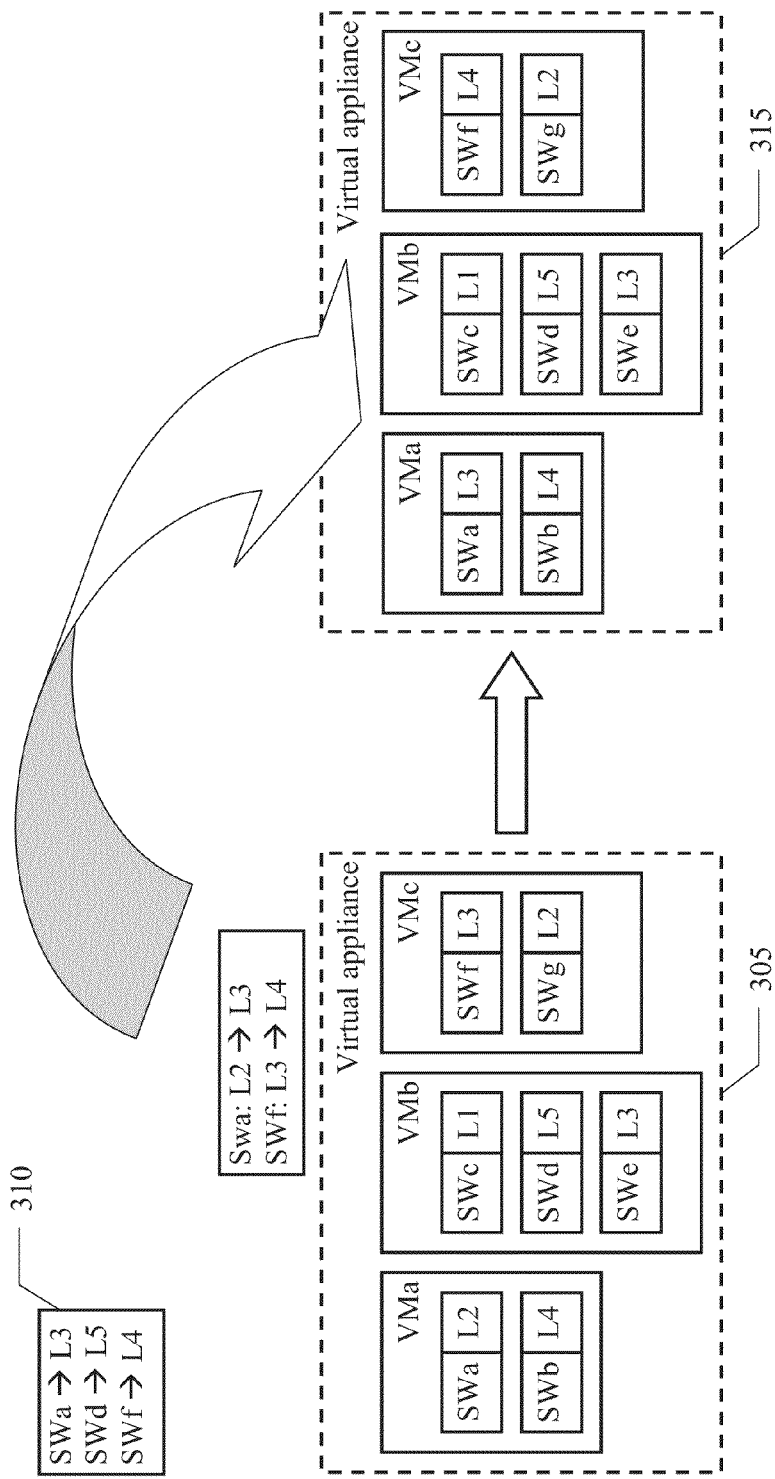

Continuing to FIG. 3E, in the cloned virtual appliance 315 each software component to be updated (i.e., the software components SWa and SWf) is brought to the desired level (i.e., level L3 for the software component SWa and level L4 for the software component SWf). For example, the corresponding maintenance packages are downloaded and applied on the corresponding virtual machines.

Figure 3F:
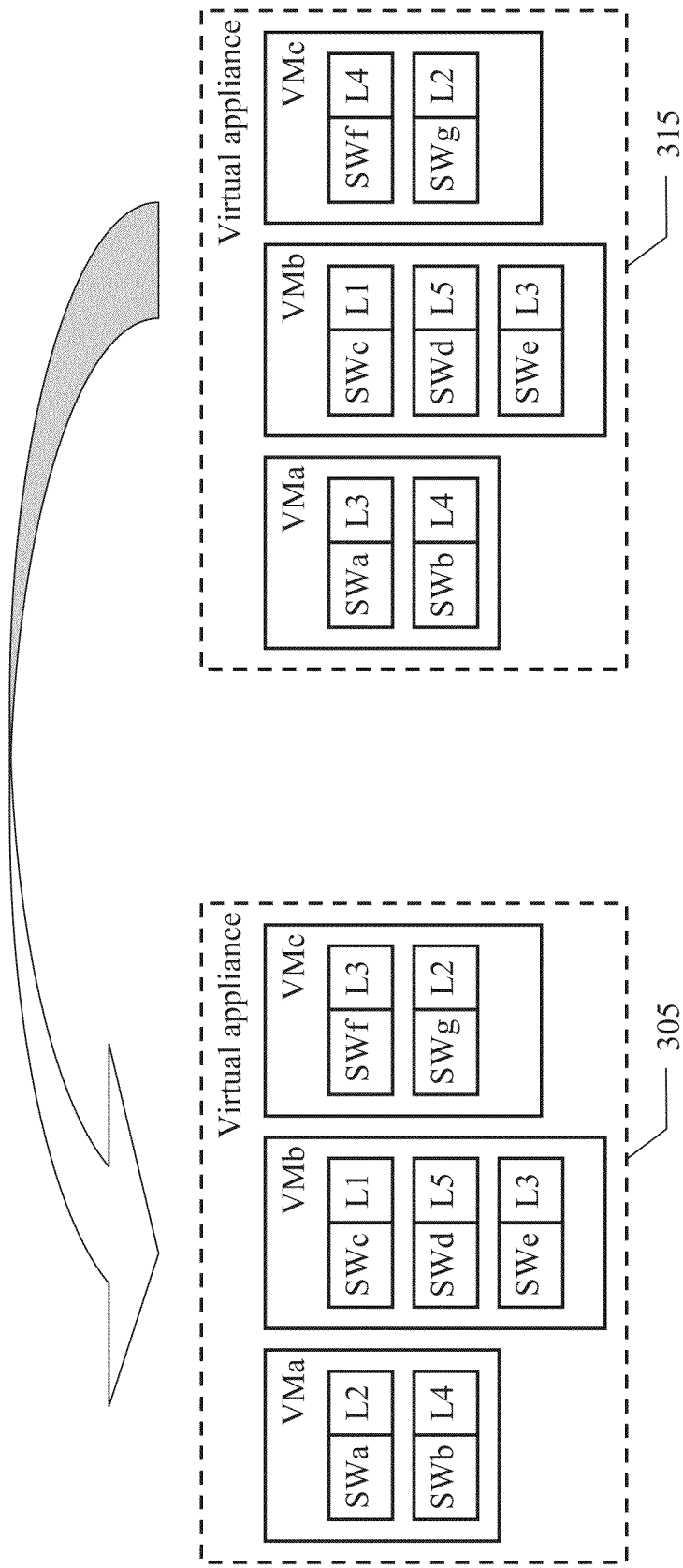

At this point, see FIG. 3F, the current virtual appliance 305 is replaced by the (updated) cloned virtual appliance 315 (with the software components SWa and SWf now at levels L3 and L4, respectively).

The various aspects of the present invention are of general applicability and are not tied to any modeling scheme of the virtual appliances, so that it may be applied to whatever virtual appliances (even when they are not based on any model).

Moreover, according to various aspects of the present invention, the maintenance of the virtual appliances is based on the actual state of the installations of the virtual appliances (taking into account any possible manual updates that may have been applied thereto). Particularly, this avoids useless maintenance operations (when some software components have already been updated as required), and it may also remove unwanted manual updates that would bring the virtual appliances to an inconsistent state.

Further, various aspects of the present invention reduce the downtime of the virtual appliances during their maintenance. Indeed, the updates are now applied to the cloned virtual appliance, while the current virtual appliance may still run during the application of the updates to the clone. The current virtual appliance is shutdown only when replaced with the cloned virtual appliance (once the desired updates have been applied).

Figure 4:
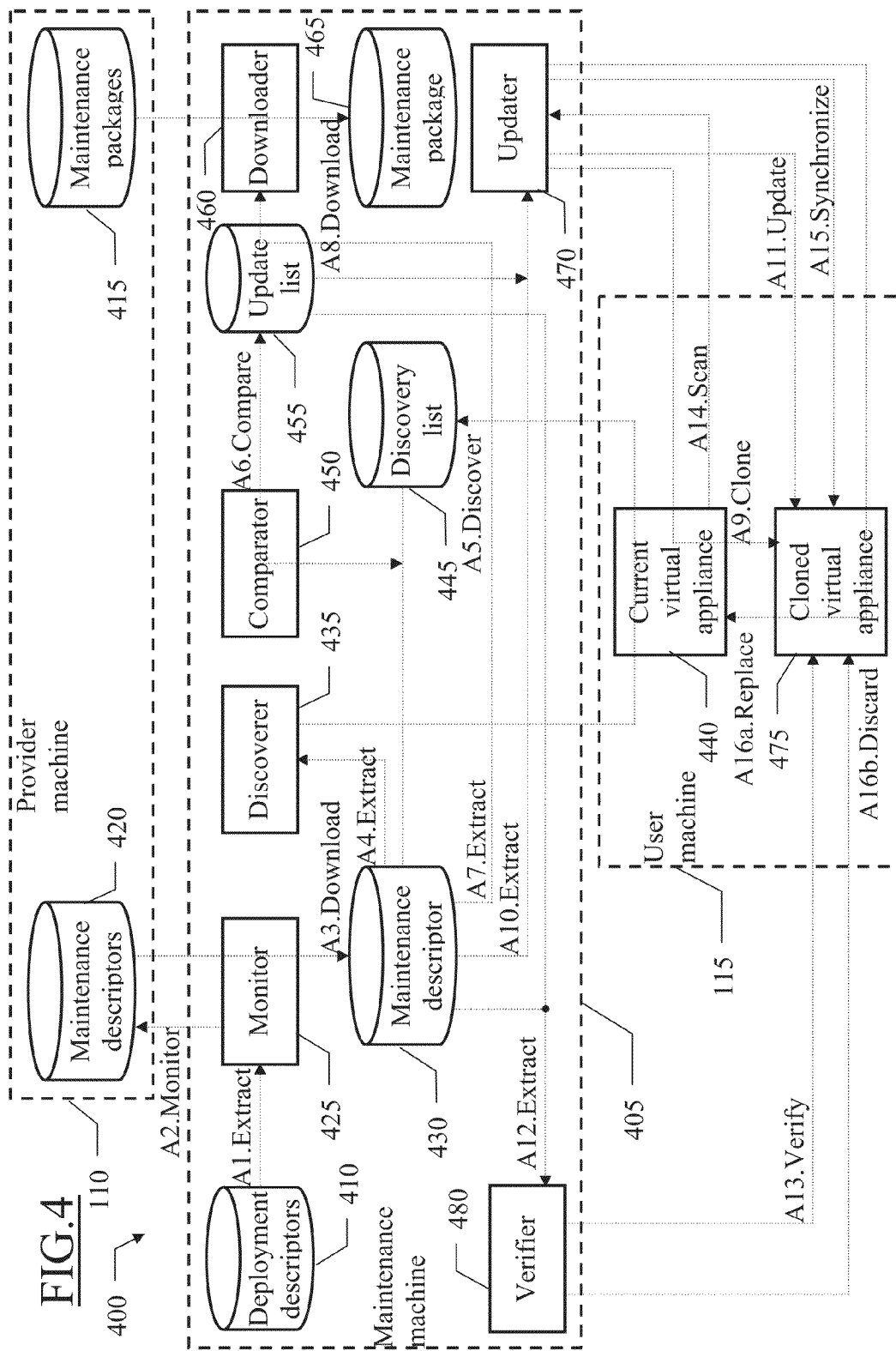
FIG. 4 shows a collaboration diagram representing the roles of the main software modules that may be used to implement various aspects of the present invention.

Referring now to FIG. 4, a collaboration diagram is shown representing the roles of the main software modules that may be used to implement various aspects of the present invention. These software modules are denoted as a whole with the reference 400. The information (programs and data) is typically stored in the hard disk and loaded (at least partially) into the working memory of the corresponding (virtual or physical) machines when the programs are running. The programs are initially installed onto each hard disk, for example, from DVD-ROM. Particularly, the figure describes both the static structure of the software modules and their dynamic behavior (by means of a series of exchanged messages, each one representing a corresponding action, denoted with sequence numbers preceded by the symbol "A").

In an illustrative implementation, a maintenance manager is implemented as a software application that orchestrates the maintenance process importing the OVF descriptor (along with the maintenance descriptor) and processing the descriptor(s). The maintenance manager includes scanning engines used to detect the version information related to the software components of the deployed appliance. Typically the scanning engine component is located on a separate machine (either physical or virtual) that has network connectivity toward: a corresponding provider's site, the hypervisor machine and the virtual appliance's nodes.

For instance, in the illustrated example, the maintenance of the virtual appliances is managed by a maintenance machine 405 (which runs a maintenance manager, described in detail below); the maintenance machine 405 consists of a physical or virtual machine that is connected (through the network, not shown in the figure) to the provider machines 110 deploying the virtual appliances and to the user machines 115 wherein the virtual appliances are installed. The maintenance machine 405 stores information in a repository comprising a deployment descriptor 410 for each virtual appliance, identified by a corresponding virtual appliance identifier (for example, a Globally Unique Identifier, or GUID), which is installed on the user machines 115 under the control thereof (for example, conforming to the Open Virtualization Format (OVF) specification).

Whenever a new level of each virtual appliance is delivered, one or more maintenance packages 415 and a maintenance descriptor 420 are published on the corresponding provider machine 110. Each maintenance package 415 may include the files used to update a corresponding software component of the virtual appliance. The maintenance descriptor 420 instead comprises the information used to handle the update of the virtual appliance (as described herein). The maintenance descriptor may contain for instance, information such as a version of the composite virtual appliance and a GUID of the composite virtual appliance. In this example, the GUID is the same one contained in the OVF descriptor of the original appliance and may be used by the system to correlate an already installed virtual appliance with its maintenance descriptor.

Particularly, the maintenance descriptor 420 comprises in an illustrative example, the virtual appliance identifier of the virtual appliance, equal to the one that is comprised in the corresponding deployment descriptor 410. Moreover, the maintenance descriptor 420 comprises an indication of a new level of the virtual appliance (for example, in the form Nv.Nr for its version Nv and release Nr). The maintenance descriptor 420 then comprises a list of all the software components of the virtual appliance (for example, its operating systems and application programs), each one uniquely identified by information such as a name and a virtual machine identifier of the virtual machine where the software component is installed.

As an illustrative example, the maintenance descriptor may further include for each individual software component belonging to the appliance, a product version, a command/signature to detect the version of the installed instance, update and configuration commands to run for upgrading the component, a URL for downloading the updated binaries such as from the provider's site, scripts for preparing/installing/verifying the upgrade installation and the nodes where the component as to be installed.

For each software component, e.g., on a given node, the maintenance manager can run a detection command for determining the actual version of the component installed on the node. After having collected the version information for all the involved software components (on all the requested nodes) the maintenance manager can determine the list of required updates for each of the components.

In the example above, for each software component, the maintenance descriptor 420 indicates its new level—for example, again in the form Nv.Nr for its version Nv and release Nr. The maintenance descriptor 420 then comprises a discovering command (or more) to be used for discovering a current level of the software component, a download address of a corresponding maintenance package, a set of (one or more) update commands to be used for applying the maintenance package on the corresponding virtual machine, and a set of (one or more) verification commands to be used for verifying the correctness of the virtual appliance after the application of the maintenance package (as described herein). As an illustrative example, a maintenance model may comprise a document that describes a virtual appliance from a software component's point of view, by including a list of all the software modules along with the nodes where they are deployed in the virtual appliance.

The maintenance manager periodically checks for new updates. For instance, periodically (for example, every night), a monitor 425 of the maintenance manager extracts the virtual appliance identifier and the maintenance address of each virtual appliance from the corresponding deployment descriptor 410 (action "A1.Extract"). The monitor 425 then verifies whether a new maintenance descriptor 420 is available (at the corresponding maintenance address) for the virtual appliance; for example, this result may be achieved by submitting a corresponding query to the maintenance address. The query may comprise the virtual appliance identifier and the level of a last maintenance descriptor, if any, that has been applied to the same virtual appliance, as logged by the monitor 425 (action "A2.Monitor"). In an illustrative implementation, a URL to be checked for new updates may be part of the configuration of the virtual appliance.

When a new maintenance descriptor 420 is available for any virtual appliance (i.e., its level is higher than the one of the last maintenance descriptor thereof, or no maintenance descriptor has been applied yet thereto)—for example, as indicated in a response that is returned to the corresponding query—the monitor 425 downloads this maintenance descriptor onto the maintenance machine 405. For clarity, the new maintenance descriptor is denoted with the reference 430 once it resides on the maintenance machine 405 (action "A3.Download").

The maintenance descriptor 430 is then accessed by a discoverer 435 of the maintenance manager. For each software component indicated in the maintenance descriptor 430, the discoverer 435 extracts the corresponding name, virtual machine identifier and discovering command (Action "A4.Extract"). The discoverer 435 then executes each discovering command on the corresponding virtual machine (indicated by its virtual machine identifier) of the virtual appliance installed on the user machine 115 (denoted with the reference 440) for discovering a current level of the corresponding software component. For example, the discovering command may include a query that directly returns the current level of the software component when it is submitted thereto; alternatively, the discovering command may include the indication of a signature of the software component that has to be retrieved from its virtual machine. The discoverer 435 saves the current level of all the software components of the virtual appliance 440 (each one identified by its name and virtual machine identifier) into a discovery list 445 (action "A5.Discover").

A comparator 450 of the maintenance manager accesses both the maintenance descriptor 430 and the discovery list 445. The comparator 450 compares the current level (from the discovery list 445) and the new level (from the maintenance descriptor 430) of each software component of the virtual appliance 440 (identified by the same name and virtual machine identifier) for determining the software components that actually need to be updated in the virtual appliance 440. For each (old) software component whose new level is different from its current level, the comparator 450 adds the corresponding name and virtual machine identifier to an update list 455 (action "A6.Compare"). In this way, since all the software components of the virtual appliance 440 are always verified, it is possible to determine whatever kind of update that is required to the virtual appliance 440; particularly, this ensures that the virtual appliance is always brought to a consistent state (for example, with the removal of any unwanted manual updates).

If the update list 455 is empty, no action is required on the virtual appliance 440 because all of its software components are already at the desired levels. Conversely, one or more software components of the virtual appliance 440 have to be updated. In this case, a summary of the updates to be applied to the virtual appliance 440 (for example, indicating the name and virtual machine identifier of each software component to be updated, together with its current level and new level) is notified to a system administrator; if the system administrator approves the updates, the system administrator schedules the update (either immediately or at a later time).

As soon as the scheduled time of the updates is reached, a downloader 460 of the maintenance manager accesses both the maintenance descriptor 430 and the update list 455. For each software component indicated in the update list 455, the downloader 460 extracts the corresponding download address from the maintenance descriptor 430 (action "A7.Extract"). The downloader 460 then downloads the maintenance package 415 of the software component from its download address onto the maintenance machine 405, wherein for clarity it is denoted with the reference 465 (action "A8.Download"). The downloading of all the maintenance packages 465 before cloning the virtual appliance 440 ensures that this operation is performed as latest as possible (so as to minimize any data changes that may be applied thereto during the application of the maintenance packages 465).

At this point, an updater 470 of the maintenance manager clones the (current) virtual appliance 440 into a (cloned) virtual appliance 475; for example, this result may be achieved by requesting the hypervisor of the user machine 115 to hot clone its virtual machines (i.e., without shutting down them so as to avoid stopping the corresponding services). The cloned virtual appliance 475 is attached to a maintenance network (for example, a Virtual Local Area Network, or VLAN) that is separated from the network of the current virtual appliance 440, so as to avoid any conflict with the running appliance (action "A9.Clone").

The maintenance manager powers on the cloned appliance. For all the software components that have to be updated, the maintenance manager copies to the relevant nodes (of the cloned appliance) the binaries required for updating the component. The maintenance manager then runs the installer. In the illustrated example, for each software component indicated in the update list 455, the updater 470 extracts the corresponding update commands from the maintenance descriptor 430 (Action "A10.Extract"). The updater 470 then applies all the maintenance packages 465 on the respective virtual machines to bring the corresponding software components to their new levels. For this purpose, the updater 470 at first turns on the cloned virtual appliance 475. For each software component indicated in the update list 455, the updater 470 copies its maintenance package 465 to the corresponding virtual machine in the cloned virtual appliance 475. The updater 470 then executes the corresponding update commands on this virtual machine. For example, the update commands may comprise an installation command for installing the maintenance package 465 and configuration commands for configuring the corresponding software component and its virtual machine and possibly any other related software components and virtual machines (action "A11.Update"). At the end of the update for all the components, the maintenance manager may run any post configuration script specified in the maintenance descriptor.

Once all the maintenance packages 465 have been applied to the cloned virtual appliance 475, a verifier 480 of the maintenance manager extracts the verification commands of each software component indicated in the update list 465 from the maintenance descriptor 430 (Action "A12.Extract"). The verifier 480 then executes the verification commands of each software component on its virtual machine in the cloned virtual appliance 475 to determine the correctness of the application of the corresponding maintenance package 465. At this point, the verifier 480 turns off the cloned virtual appliance 475 (action "A13.Verify").

If the result of the verification is positive for all the software components (meaning that the cloned virtual appliance 475 has been correctly brought to its new level), the updater 470 turns off the current virtual appliance 440. The updater 470 then determines any data changes that have been applied to the current virtual appliance 440 after its cloning (for example, by scanning a corresponding log starting from a time of the cloning) (action "A14.Scan"). The updater 470 applies these data changes to the cloned virtual appliance 475 so as to re-synchronize it with the current virtual appliance 440 (action "A15.Synchronize"). This prevents losing any change to local data that may have occurred in the current virtual appliance 440 during the update process (and which the cloned virtual appliance 475 cannot be aware of). At this point, the updater 470 replaces the current virtual appliance 440 with the cloned virtual appliance 475 (updated to its new level and synchronized with the data changes of the current virtual appliance 440). The current virtual appliance 440 is discarded and the cloned virtual appliance 475 is turned on by switching its maintenance network to the actual network being used in production (action "A16a.Replace").

Conversely, when one or more errors are detected in the cloned virtual appliance 475, the verifier 480 discards the cloned virtual appliance 475, so as to continue using the current virtual appliance 440 seamlessly (action "A16b.Discard"); in this way, the update process is carried out in a transactional-like way, by rolling back the updates that have been applied (to the cloned virtual appliance 475) if any error is detected during the update process.

Using a hot cloned appliance the only time-frame when the virtual appliance is offline may be represented by the time required to shutdown the original appliance and to activate the upgraded and cloned one. This time window is much shorter than the one corresponding to directly upgrading the original appliance that would require to keep the original appliance offline for the entire duration of the upgrade process. Any data change that occurs in the original appliance during the upgrade process that the cloned appliance would not be aware of, could be resynchronized in the cloned appliance once the cloned appliance gets activated through a rediscovery process initiated by the cloned appliance.

In order to satisfy local and specific requirements, a person skilled in the art may apply modifications to various aspects of the present invention. More specifically, although aspects of the present invention have been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method elements described in connection with any embodiment of the disclosed aspects of the present invention may be incorporated in any other embodiment as a matter of general design choice. In any case, the terms include, comprise, have and contain (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

More generally, an embodiment of the invention provides a method for maintaining a virtual appliance. Similar considerations apply if various aspects of the present invention are implemented with an equivalent method (by using similar elements with the same functions of more elements or portions thereof, removing some elements being non-essential, or adding further optional elements); moreover, the elements may be performed in a different order, concurrently or in an interleaved way (at least in part). The virtual appliance may comprise any number (one or more) of whatever software components (for example, operating systems, application programs, configuration files, and the like) each one installed on a corresponding virtual machine.

In an embodiment of the invention, a maintenance descriptor is provided; the maintenance descriptor comprises whatever indication of a new level of (at least) each one of the software components to be updated thereto (for example, their version and/or release number or date). For each software component indicated in the maintenance descriptor, a current level is determined of the software component that is installed on the corresponding virtual machine. A set of old ones of the software components to be actually updated is determined according to a comparison between the corresponding current levels and new levels. The virtual appliance is cloned (preferably, in a hot way—even if any other cloning mode is not excluded). The cloned virtual appliance is then updated by updating each old software component thereto to the corresponding new level. At this point, the virtual appliance is replaced by the updated cloned virtual appliance.

In an embodiment of the invention, the maintenance descriptor comprises an indication of the new level of each one of all the software components. In any case, a basic implementation is not excluded wherein the maintenance descriptor only comprises the software components that have been updated with respect to a previous level (or more) of the virtual appliance.

In an embodiment of the invention, the virtual appliance is associated with an appliance descriptor comprising an appliance identifier of the virtual appliance and the maintenance descriptor is associated with said appliance identifier. In this case, the maintenance descriptor is retrieved by extracting the appliance identifier from the appliance descriptor, and retrieving the maintenance descriptor associated with the appliance identifier. However, similar considerations apply if the appliance identifier is defined in a different way, or if the maintenance descriptor is retrieved in any other way (even independently of any appliance descriptor of the corresponding virtual appliance).

In an embodiment of the invention, the appliance descriptor further comprises a maintenance address for the maintenance descriptor; in this case, the maintenance descriptor is retrieved by downloading it from the maintenance address. Alternatively, nothing prevents downloading the maintenance descriptor from the same address from which the corresponding virtual appliance has been deployed.

In an embodiment of the invention, the maintenance descriptor is retrieved by monitoring the maintenance address for the availability of a new maintenance descriptor more recent than a last maintenance descriptor that has been successfully applied on the virtual appliance. Alternatively, the level of the maintenance descriptor may be defined in any other way (for example, simply by a timestamp thereof); moreover, it is also possible to trigger the verification of the availability of the maintenance descriptor manually.

In an embodiment of the invention, for each software component indicated in the maintenance descriptor a set of (one or more) discovering commands is comprised in the maintenance descriptor. In this case, the element of determining, for each software component indicated in the maintenance descriptor, the current level of the software component as installed on the corresponding virtual machine comprises extracting the corresponding discovering commands from the maintenance descriptor, and executing the corresponding discovering commands on the corresponding virtual machine. Similar considerations apply to any other discovering commands (for example, simply based on a timestamp of corresponding files); in any case, it is also possible to discover the current levels of the software components in a different way, even independently of the maintenance descriptor (for example, by means of an external scanner).

In an embodiment of the invention, for each software component indicated in the maintenance descriptor a download address is comprised in the maintenance descriptor; in this case, the updating of the cloned virtual appliance comprises extracting the corresponding download address from the maintenance descriptor, downloading a maintenance package for the old software component from the corresponding download address, and applying the maintenance package on the corresponding virtual machine. Alternatively, nothing prevents downloading the maintenance package from the same address from which the corresponding maintenance descriptor has been retrieved; moreover, it is also possible to update the software components in a different way (for example, by exploiting a software distribution application).

In an embodiment of the invention, for each software component indicated in the maintenance descriptor a set of (one or more) update commands is comprised in the maintenance descriptor; in this case, the updating of the cloned virtual appliance comprising extracting the corresponding update commands from the maintenance descriptor, and executing the corresponding update commands on the corresponding virtual machine. Similar considerations apply if similar and/or alternative update commands are provided (for example, for preparing the software components); however, it is also possible to update the software components by simply launching the corresponding maintenance packages without the need of any additional command.

In an embodiment of the invention, the method further comprises verifying a correctness of the updated cloned virtual appliance, and enabling the replacement of the virtual appliance by the updated cloned virtual appliance in response to a positive result of the verification or discarding the updated cloned virtual appliance otherwise. However, a basic implementation wherein the updated cloned virtual appliance is verified manually is not excluded.

In an embodiment of the invention, for each software component indicated in the maintenance descriptor a set of (one or more) verification commands is comprised in the maintenance descriptor; in this case, the verification of the correctness of the updated cloned virtual appliance comprises extracting the corresponding verification commands from the maintenance descriptor, and executing the corresponding verification commands on the corresponding virtual machine. As above, it is also possible to verify the updated cloned virtual appliance in a different way, even independently of the maintenance descriptor (for example, by means of built-in test functions thereof—even simply at the level of the whole virtual appliance).

In an embodiment of the invention, the method further comprises determining data changes that have applied to local data of the virtual appliance between the element of cloning the virtual appliance and the element of replacing the virtual appliance by the updated cloned virtual appliance, and applying the data changes to the replaced virtual appliance. Similar considerations apply if this re-synchronization is performed in a different way (for example, by means of a differentiation process); in any case, it is also possible to simply prevent any changes to the local data during the update process (so as to avoid the need of its re-synchronization).

Aspects of the present invention are of general applicability and are not strictly tied to a specific modeling scheme of the virtual appliances. As such, aspects described herein can be applied to any other virtual appliances. Moreover, the aspects described herein do not cause problems when manual updates are applied to the virtual appliances (independently of a centralized maintenance thereof). More specifically, aspects herein avoid useless maintenance operations when some software components have already been updated as required; conversely, unwanted manual updates will not bring the virtual appliances to an inconsistent state that is not detected by the centralized maintenance. Still further, aspects herein minimize or otherwise avoid downtime of the virtual appliances during their maintenance, which downtime should be kept as short as possible (especially in critical applications).

Another embodiment of the invention provides a computer program, which comprises code means for causing a data-processing system (for example, a user machine) to perform the elements of the above-described method when the computer program is executed on the data-processing system.

Another embodiment of the invention provides a computer program product comprising a non-transitory computer readable storage medium (e.g., computer readable device) embodying a computer readable program embodied thereon. For example, the computer program may comprise code means directly loadable into a working memory of a data-processing system thereby configuring the data-processing system to perform the same method.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In any case, various aspects of the present invention may be implemented as a stand-alone module, or even directly in each virtual appliance. It would be readily apparent that it is also possible to deploy various aspects of the present invention as a service that is accessed through the network. Similar considerations apply if the program (which may be used to implement each embodiment of the invention) is structured in a different way, or if additional modules or functions are provided; likewise, the memory structures may be of other types, or may be replaced by equivalent entities (not necessarily consisting of physical storage media). The program may take any form suitable to be used by any data-processing system or in connection therewith (for example, within a virtual machine), thereby configuring the system to perform the desired operations; particularly, the program may be in the form of external or resident software, firmware, or microcode (either in object code or in source code—for example, to be compiled or interpreted).

Moreover, it is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are fixed disks (where the program may be pre-loaded), removable disks, tapes, cards, wires, fibers, wireless connections, networks, broadcast waves, and the like. In any case, various aspects of the present invention lends itself to be implemented even with a hardware structure (for example, integrated in a chip of semiconductor material), or with a combination of software and hardware suitably programmed or otherwise configured.

Another embodiment of the invention provides a system (for example, a user machine) comprising means for performing the elements of the above-described method. Similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. ("Java" is a registered trademark of Oracle America, Inc., a Delaware Corporation, located at 500 Oracle Parkway, Redwood Shores, Calif. 94065.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method for maintaining a current virtual appliance comprising a set of software components each one installed on a corresponding virtual machine, wherein the method comprises:
    retrieving a maintenance descriptor comprising an indication of a new level of at least one of the software components to be updated;
    determining, for each software component indicated in the maintenance descriptor, a current level of the software component being installed on the corresponding virtual machine;
    determining a set of old ones of the software components to be actually updated according to a comparison between the corresponding current levels and new levels;
    determining local data of the current virtual appliance,
    cloning the current virtual appliance in response to determining that software components need to be updated;
    updating the cloned virtual appliance by updating each old software component thereof to the new level, wherein the updating occurs while the current virtual appliance is running;
    determining changes to the local data of the current virtual appliance that occurred to the current virtual appliance during the updating of the cloned virtual appliance;
    applying the changes to the local data of the current virtual appliance to the updated cloned virtual appliance; and
    replacing the current virtual appliance with the updated cloned virtual appliance.

2. The method according to claim 1, wherein the maintenance descriptor comprises an indication of the new level of each one of all the software components.

3. The method according to claim 1, wherein the current virtual appliance is associated with an appliance descriptor comprising an appliance identifier of the current virtual appliance and the maintenance descriptor is associated with said appliance identifier, wherein retrieving a maintenance descriptor further comprises:
    extracting the appliance identifier from the appliance descriptor; and
    retrieving the maintenance descriptor associated with the appliance identifier.

4. The method according to claim 1, wherein the appliance descriptor further comprises a maintenance address for the maintenance descriptor, wherein retrieving a maintenance descriptor further comprises:
    downloading the maintenance descriptor from the maintenance address.

5. The method according to claim 4, wherein retrieving a maintenance descriptor further comprises:
    monitoring the maintenance address for the availability of a new maintenance descriptor more recent than a last maintenance descriptor being successfully applied on the current virtual appliance.

6. The method according to claim 1, wherein the maintenance descriptor further includes a set of discovering commands for at least one software component indicated in the maintenance descriptor, wherein determining, for each software component indicated in the maintenance descriptor, a current level of the software component being installed on the corresponding virtual machine comprises:
    extracting the corresponding discovering commands from the maintenance descriptor; and
    executing the corresponding discovering commands on the corresponding virtual machine.

7. The method according to claim 1, wherein the maintenance descriptor further includes a download address for each software component indicated in the maintenance descriptor, wherein updating the cloned virtual appliance by updating each old software component of the cloned virtual appliance to the new level further comprises:
    extracting the corresponding download address from the maintenance descriptor;
    downloading a maintenance package for the old software component from the corresponding download address; and
    applying the maintenance package on the corresponding virtual machine.

8. The method according to claim 1, wherein the maintenance descriptor includes a set of update commands for each software component indicated in the maintenance descriptor, wherein updating the cloned virtual appliance by updating each old software component of the cloned virtual appliance to the new level further comprises:
    extracting the corresponding update commands from the maintenance descriptor; and
    executing the corresponding update commands on the corresponding virtual machine.

9. The method according to claim 1, further comprising:
    verifying a correctness of the updated cloned virtual appliance;
    replacing the current virtual appliance with the updated cloned virtual appliance in response to a positive result of the verifying; and
    discarding the updated cloned virtual appliance in response to a negative result of the verifying.

10. The method according to claim 9, wherein the maintenance descriptor includes a set of verification commands for each software component indicated in the maintenance descriptor, wherein verifying a correctness of the updated cloned virtual appliance comprises:
    extracting the corresponding verification commands from the maintenance descriptor; and
    executing the corresponding verification commands on the corresponding virtual machine.

11. Computer-readable hardware with an executable program for maintaining a current virtual appliance comprising a set of software components each one installed on a corresponding virtual machine stored thereon, wherein the program instructs a processor to perform:
    retrieving a maintenance descriptor comprising an indication of a new level of at least one of the software components to be updated;
    determining, for each software component indicated in the maintenance descriptor, a current level of the software component being installed on the corresponding virtual machine;
    determining a set of old ones of the software components to be actually updated according to a comparison between the corresponding current levels and new levels;
    determining local data of the current virtual appliance,
    cloning the current virtual appliance in response to determining that software components need to be updated;
    updating the cloned virtual appliance by updating each old software component thereof to the new level, wherein the updating occurs while the current virtual appliance is running;
    determining changes to the local data of the current virtual appliance that occurred to the current virtual appliance during the updating of the cloned virtual appliance;
    applying the changes to the local data of the current virtual appliance to the updated cloned virtual appliance; and
    replacing the current virtual appliance with the updated cloned virtual appliance.

12. The computer-readable hardware according to claim 11, wherein the current virtual appliance is associated with an appliance descriptor comprising an appliance identifier of the current virtual appliance and the maintenance descriptor is associated with said appliance identifier, wherein retrieving a maintenance descriptor further comprises the program instructing the processor to perform:
    extracting the appliance identifier from the appliance descriptor; and
    retrieving the maintenance descriptor associated with the appliance identifier.

13. The computer-readable hardware according to claim 11, wherein the appliance descriptor further comprises a maintenance address for the maintenance descriptor, wherein retrieving a maintenance descriptor further comprises the program instructing the processor to perform:
    downloading the maintenance descriptor from the maintenance address; and
    monitoring the maintenance address for the availability of a new maintenance descriptor more recent than a last maintenance descriptor being successfully applied on the current virtual appliance.

14. The computer-readable hardware according to claim 11, wherein the maintenance descriptor further includes a download address for each software component indicated in the maintenance descriptor, wherein updating the cloned virtual appliance by updating each old software component of the cloned virtual appliance to the new level further comprises the program instructing the processor to perform:
    extracting the corresponding download address from the maintenance descriptor;
    downloading a maintenance package for the old software component from the corresponding download address; and
    applying the maintenance package on the corresponding virtual machine.

15. The computer-readable hardware according to claim 11, wherein the maintenance descriptor includes a set of update commands for each software component indicated in the maintenance descriptor, wherein updating the cloned virtual appliance by updating each old software component of the cloned virtual appliance to the new level further comprises the program instructing the processor to perform:

extracting the corresponding update commands from the maintenance descriptor; and executing the corresponding update commands on the corresponding virtual machine.

16. The computer-readable hardware according to claim 11, further comprising the program instructing the processor to perform:

verifying a correctness of the updated cloned virtual appliance;

replacing the current virtual appliance with the updated cloned virtual appliance in response to a positive result of the verifying; and discarding the updated cloned virtual appliance in response to a negative result of the verifying.

17. The computer-readable hardware according to claim 16, wherein the maintenance descriptor includes a set of verification commands for each software component indicated in the maintenance descriptor, wherein verifying a correctness of the updated cloned virtual appliance comprises the program instructing the processor to perform:

extracting the corresponding verification commands from the maintenance descriptor; and executing the corresponding verification commands on the corresponding virtual machine.

18. A system comprising:

a processor coupled to a memory;

wherein the processor is programmed to maintain a current virtual appliance comprising a set of software components each one installed on a corresponding virtual machine by:

retrieving a maintenance descriptor comprising an indication of a new level of at least one of the software components to be updated;

determining, for each software component indicated in the maintenance descriptor, a current level of the software component being installed on the corresponding virtual machine;

determining a set of old ones of the software components to be actually updated according to a comparison between the corresponding current levels and new levels;

determining local data of the current virtual appliance, cloning the current virtual appliance in response to determining that software components need to be updated;

updating the cloned virtual appliance by updating each old software component thereof to the new level, wherein the updating occurs while the current virtual appliance is running;

determining changes to the local data of the current virtual appliance that occurred to the current virtual appliance during the updating of the cloned virtual appliance;

applying the changes to the local data of the current virtual appliance to the updated cloned virtual appliance; and replacing the current virtual appliance with the updated cloned virtual appliance.

19. The system according to claim 18, wherein the current virtual appliance is associated with an appliance descriptor comprising an appliance identifier of the current virtual appliance and the maintenance descriptor is associated with said appliance identifier, wherein retrieving a maintenance descriptor further comprises:

extracting the appliance identifier from the appliance descriptor; and retrieving the maintenance descriptor associated with the appliance identifier.

20. The system according to claim 18, wherein the maintenance descriptor further includes a download address for each software component indicated in the maintenance descriptor, wherein updating the cloned virtual appliance by updating each old software component of the cloned virtual appliance to the new level further comprises:

extracting the corresponding download address from the maintenance descriptor;

downloading a maintenance package for the old software component from the corresponding download address; and applying the maintenance package on the corresponding virtual machine.

21. The system according to claim 18, wherein the maintenance descriptor includes a set of update commands for each software component indicated in the maintenance descriptor, wherein updating the cloned virtual appliance by updating each old software component of the cloned virtual appliance to the new level further comprises:

extracting the corresponding update commands from the maintenance descriptor; and executing the corresponding update commands on the corresponding virtual machine.

22. The system according to claim 18, further comprising:

verifying a correctness of the updated cloned virtual appliance;

replacing the current virtual appliance with the updated cloned virtual appliance in response to a positive result of the verifying; and discarding the updated cloned virtual appliance in response to a negative result of the verifying;

wherein the maintenance descriptor includes a set of verification commands for each software component indicated in the maintenance descriptor, wherein verifying a correctness of the updated cloned virtual appliance comprises:

extracting the corresponding verification commands from the maintenance descriptor; and executing the corresponding verification commands on the corresponding virtual machine.

* * * * *